(12) United States Patent
Sebright et al.

(10) Patent No.: US 6,575,857 B2
(45) Date of Patent: Jun. 10, 2003

(54) AUTOMATIC BELT POSITIONING ASSEMBLY

(75) Inventors: Brent H. Sebright, Hopkins, MI (US); Stuart Sebright, Allegan, MI (US); Joseph W. Dendel, Allegan, MI (US); Benjamin W. Dietz, Allegan, MI (US)

(73) Assignee: Sebright Products, Inc., Hopkins, MI (US)

( * ) Notice: Subject to any disclaimer, the term of this patent is extended or adjusted under 35 U.S.C. 154(b) by 0 days.

(21) Appl. No.: 09/683,755

(22) Filed: Feb. 11, 2002

(65) Prior Publication Data

US 2002/0165055 A1 Nov. 7, 2002

Related U.S. Application Data

(60) Provisional application No. 60/287,895, filed on May 1, 2001.

(51) Int. Cl.⁷ .............................. F16H 7/22; F16H 7/08; B65G 39/16
(52) U.S. Cl. .................... 474/106; 474/102; 198/807
(58) Field of Search ....................... 474/119–122, 102, 474/103, 70, 101, 104, 106; 198/806, 807, 811, 840, 808, 810

(56) References Cited

U.S. PATENT DOCUMENTS

| | | | |
|---|---|---|---|
| 3,368,665 A | * | 2/1968 | Jinkins ........................ 474/106 |
| 3,512,691 A | * | 5/1970 | Neifield et al. ................ 226/23 |
| 3,687,273 A | * | 8/1972 | Macone et al. ............. 198/806 |
| 3,710,927 A | * | 1/1973 | Alsted ......................... 198/807 |
| 3,762,561 A | | 10/1973 | Davis |
| 4,137,062 A | | 1/1979 | Mullerheim et al. |
| 4,189,223 A | * | 2/1980 | Silverberg .................. 474/104 |
| 4,959,040 A | * | 9/1990 | Gardner et al. ............. 474/103 |
| 5,462,677 A | | 10/1995 | Bensei |
| 5,510,877 A | * | 4/1996 | deJong et al. ............... 399/165 |
| 5,565,965 A | * | 10/1996 | Costanza et al. ........... 399/167 |
| 5,979,641 A | | 11/1999 | Graf |
| 6,116,410 A | * | 9/2000 | Malmberg .................. 198/806 |
| 6,126,512 A | | 10/2000 | Chao et al. |

\* cited by examiner

Primary Examiner—Marcus Charles
(74) Attorney, Agent, or Firm—McGarry Bair PC

(57) ABSTRACT

A device for adjusting the lateral position of an endless belt comprises a sensor for detecting the lateral position of the endless belt relative to a predetermined position, a roller disposed adjacent to the endless belt, and a controller operatively connected to the sensor and to the roller by way of an air bellows, wherein the controller will automatically cause the air bellows to move the roller to urge the endless belt toward the predetermined positioned when the sensor detects that the lateral position of the endless belt is away from the predetermined position.

11 Claims, 5 Drawing Sheets

AUTOMATIC BELT POSITIONING ASSEMBLY

CROSS REFERENCE TO RELATED APPLICATION

This application claims the benefit of U.S. Provisional Application No. 60/287,895, filed May 1, 2001.

BACKGROUND OF THE INVENTION

1. Field of the Invention

This invention relates to devices for adjusting the lateral position of a moving belt. In one aspect, the invention relates to a belt positioning assembly for automatically adjusting the position of a belt during operation of a belt filter press.

2. Description of the Related Art

Belt filter presses are utilized to remove liquid from a mixture of liquid and solid material, leaving a relatively dry, solid "cake" for disposal or further processing. The belt filter press comprises a frame and an assembly of rollers that support and drive an upper continuous belt and a lower continuous belt that are in operable communication with each other. The belts are permeable to allow the extrusion of the liquid therethrough. The mixture is first placed on the lower belt, then "sandwiched" between the upper and lower belts. The belts and the retained mixture then pass through a wedge section where the mixture is evenly distributed between the belts, and an initial volume of liquid is removed. The belts then pass through a series of progressively smaller diameter rollers where the retained mixture is compressed for further liquid removal. The belts are then separated and the dry "cake" is removed from the belts, generally by a scraping apparatus. The belts then pass through one or more belt washers, after which the process is repeated. The liquid from the extrusion and belt washing processes are collected for disposal.

The belts must remain in alignment relative to the rollers and to each other for proper filter press operation and dewatering of the material. The belts are typically aligned at the beginning of the operation. Any misalignment that occurs during operation of the filter press generally necessitates a shutdown of the filter press so that the belts can be realigned.

SUMMARY OF THE INVENTION

The invention comprises a device for adjusting the lateral position of an endless belt. It includes a sensor for detecting the lateral position of an endless belt relative to a predetermined position; a roller disposed adjacent to the endless belt; a controller operatively connected to the sensor and to the roller, and an air bellows operably connected to the controller to move the roller laterally in response to a signal from the controller. The volume of air in the bellows is controlled by an air valve and the controller signals the air valve to open and close to adjust the air volume in the air bellows so that the controller will automatically cause the roller to urge the endless belt toward the predetermined position when the sensor detects that the lateral position of the endless belt is away from the predetermined position. Preferably, the sensor comprises an inductive proximity transducer and comprises a wheel disposed against an edge of the belt in rotational communication therewith. The sensor signals the lateral position of the endless belt to the controller, which is preferably a computer.

In another aspect of the invention, a device for adjusting the lateral position of an endless belt disposed to move over a roller in a given direction comprises a sensor for detecting the lateral position of the endless belt relative to a predetermined position; an air bellows operably connected to at least one end of the roller in a position to adjust the position of the roller relative to the belt by expansion or contraction of the bellows; and a controller operatively connected to the sensor and to the air bellows. The controller will automatically cause the air bellows to expand or contract, thereby adjusting the position of the roller to urge the endless belt toward the predetermined positioned when the sensor detects that the lateral position of the endless belt is away from the predetermined position.

The air bellows urges the one end of the roller to move in the given direction to cause the belt to move laterally relative to the roller. In this case, the air bellows is positioned in the given direction. There can be a first air bellows and a second air bellows, where the second air bellows is positioned in the given direction opposite the one end of the roller from the first air bellows. Either way, an air valve is preferably positioned between the controller and the air bellows, and the controller automatically causes the air bellows to expand or contract by signaling the air valve.

DESCRIPTION OF THE PREFERRED EMBODIMENT

The embodiment of the claimed invention described herein is based upon the invention's use in a belt filter press. It will be readily apparent to one of ordinary skill in the art that the invention can be used in any application requiring automatic adjustment of the lateral position of a moving belt. Thus, the invention is not limited to use in a belt filter press.

Figure 1:
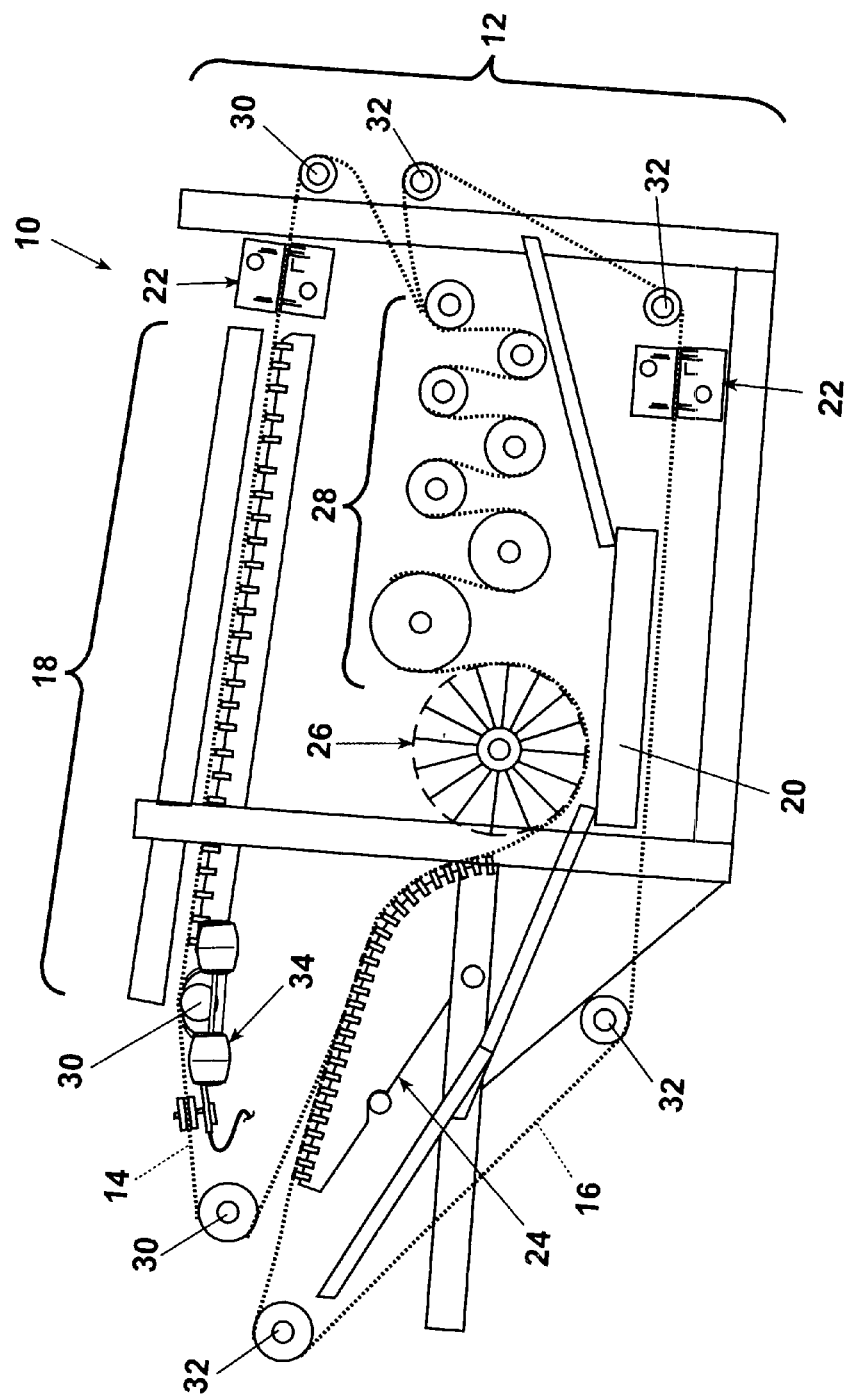
FIG. 1 is a side elevation view of a schematic of a belt filter press illustrating the configuration of belts adjustable by the belt positioning assembly according to the invention.

Referring now to FIG. 1, a belt filter press 10 according to the invention comprises a frame 12, an upper belt 14, a lower belt 16, a waste placement apparatus 18, liquid catch pans 20, belt washers 22, a wedge section 24, a primary roller 26, secondary rollers 28, upper belt guide rollers 30, lower belt guide rollers 32, and a belt alignment assembly 34. It will be readily understood by one skilled in the art that the belt filter press of FIG. 1 will also comprise suitable belt tensioning devices, belt drives, and controls, which for purposes of this disclosure will not be described herein. As with a conventional belt filter press, the belt filter press 10 of FIG. 1 extrudes liquid from a mixture of solid and liquid material by "sandwiching" the mixture between the two belts 14, 16, passing the belts over the wedge section 24 and around the wing roller 26 and secondary rollers 28, and discharging the dewatered solids upon separation of the belts 14, 16.

Figure 2:
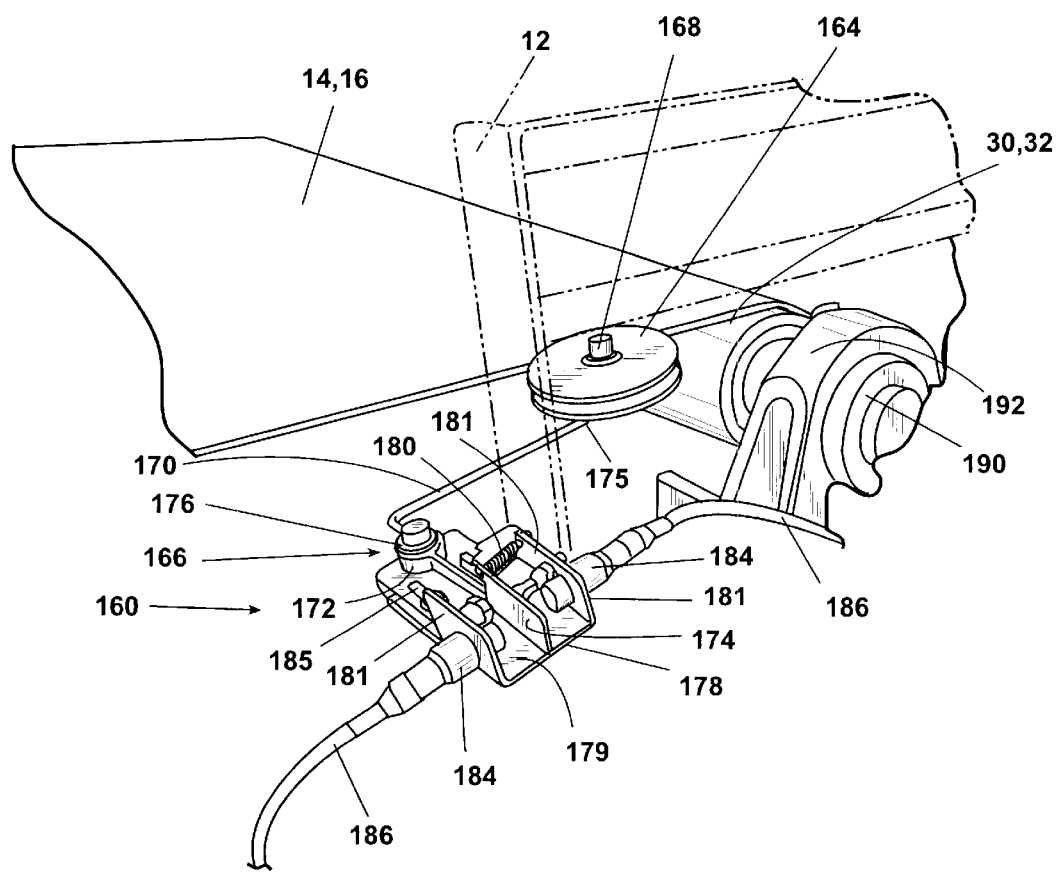
FIG. 2 is a perspective view of a belt control assembly for the belt filter press of FIG. 1.
Figure 3:
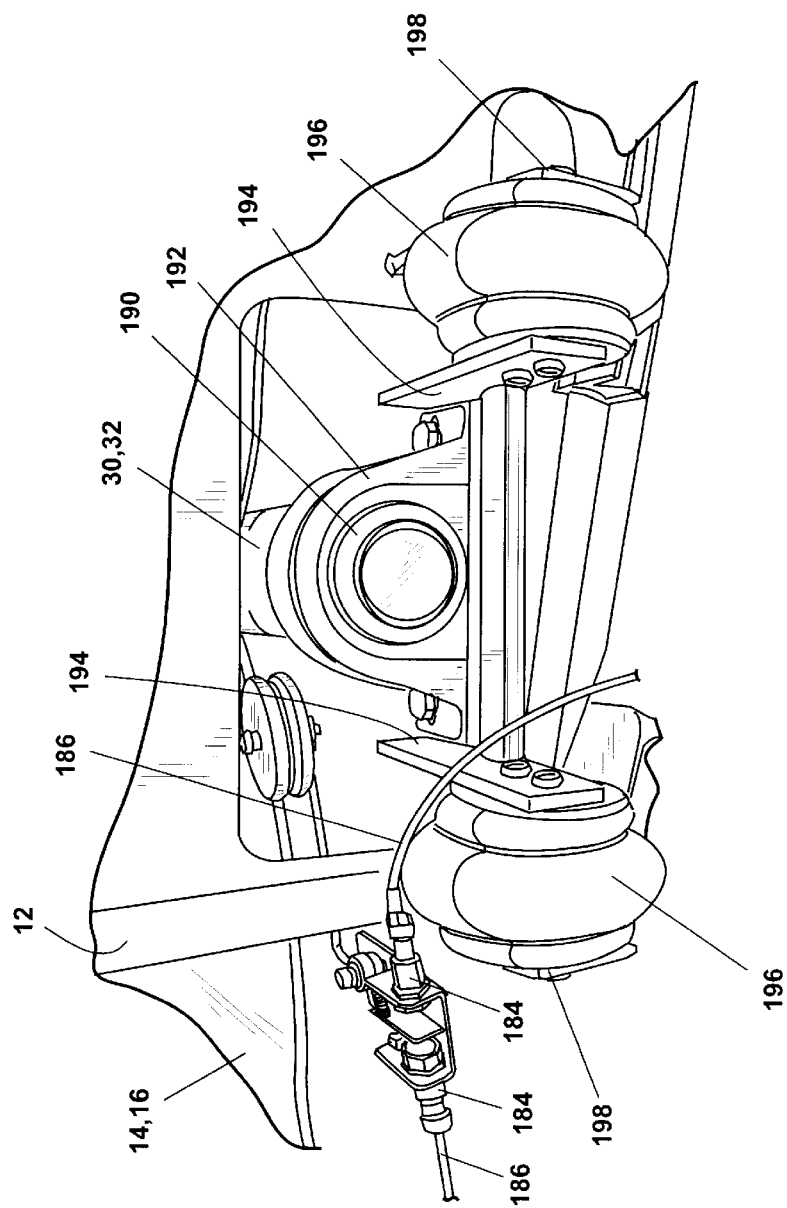
FIG. 3 is a perspective view of a belt adjustment assembly for the belt filter press of FIG. 1.
Figure 4:
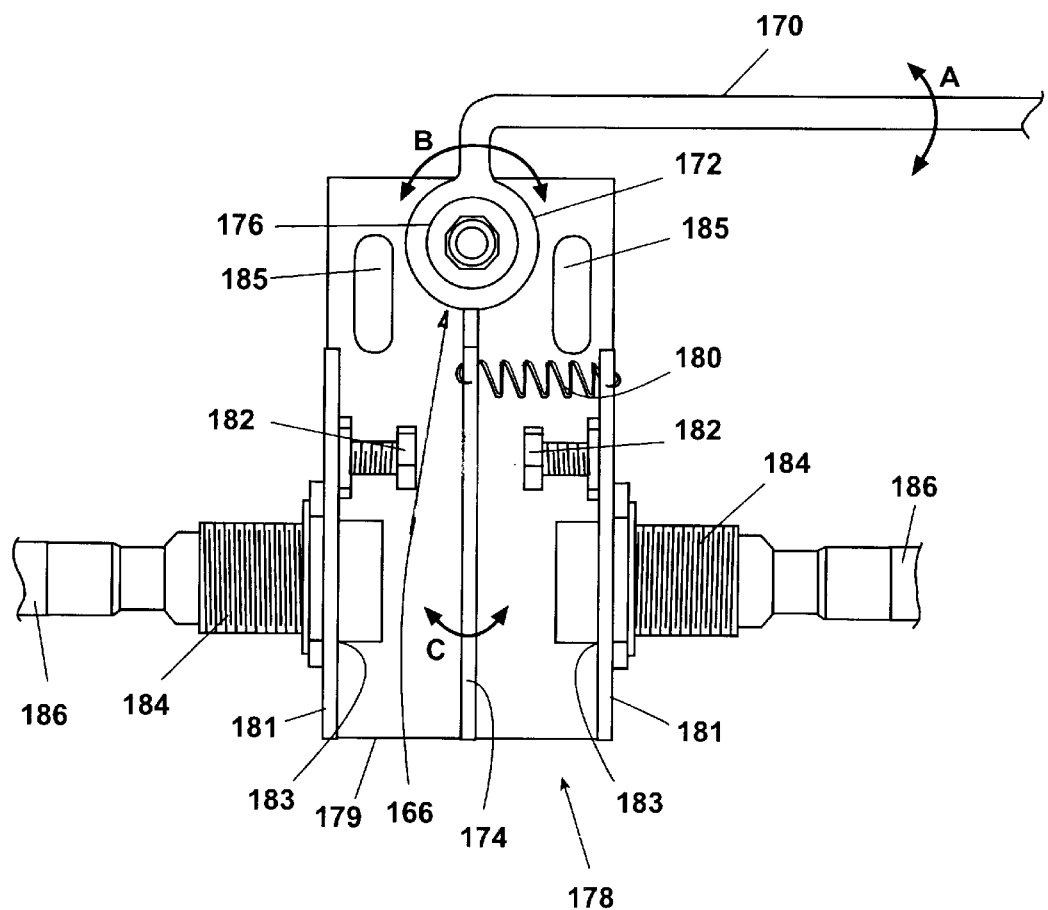
FIG. 4 is a plan view of a portion of the belt control assembly of FIG. 2 showing a sensor arm, inductive proximity switches, stops, and a mounting bracket.

The belts in a conventional belt filter press are typically maintained in tension. As the belts travel through the belt filter press, they can move laterally on the guide rollers. This lateral movement may be sufficiently great that the belts contact the frame or other components, or the dewatering process is otherwise adversely affected. When this occurs, the belt filter press must typically be shut down to realign the belts. Referring to FIGS. 2–4, a belt control assembly 160 according to the invention comprises a contact wheel 164, a lever arm 166, at least one inductive proximity switch 184, and a bracket 178. The lever arm 166 comprises a wheel arm 170 and a sensor arm 174. Intermediate the wheel arm 170 and the sensor arm 174 is a pivot bearing 172 provided with a pivot aperture 176 therethrough. The wheel arm 170 is an elongated member extending from the pivot bearing 172 and terminating in a free end 175 to which is rotatably attached the contact wheel 164 using a suitable wheel bearing 168. The wheel arm 170 has an orthogonal bend intermediate the free end 175 and the pivot bearing 172. Extending in a generally opposite direction from the wheel arm 170 is the sensor arm 174. The sensor arm 174 comprises a generally flat, elongated member. The bracket 178 comprises a base 179 and parallel, upstanding opposing flanges 181. The base 179 is provided with at least one suitable aperture or slot 185 for mounting the bracket 178 to the frame 12. Each flange 181 is provided with an adjustable stop 182. In the preferred embodiment, the stop 182 comprises a bolt that is threaded into a threaded aperture in the flange 181. The flanges are provided with switch apertures 183 adapted to receive and retain at least one inductive proximity switch 184. A suitable switch is the model number PKW-ON-1H inductive proximity sensor supplied by Automationdirect.com of Cumming, Ga. The inductive proximity switch 184 generates an electrical sensing field, and the switch is activated by the presence of the lever arm 166 in the field. A spring 180 extends from the lever arm 166 to one of the flanges 181. The switch 184 is connected by a suitable electrical cable 186 to a suitable control module 188.

The bracket 178 is fixedly attached to the frame 12 so that the contact wheel 164 is in operable communication with the belt 14, 16. The spring 180 will maintain the wheel 164 in contact with the belt 14, 16. As the belt 14, 16 moves longitudinally, the wheel 164 will follow the lateral displacement of the belt 14, 16. Movement of the wheel 164 in response to the lateral movement of the belt 14, 16 will pivot the lever arm 166 about the pivot bearing 172, which will displace the sensor arm 174. With the sensor arm 174 in its centered position, the switches 184 will be in an unactuated or "switch off" condition. If the sensor arm 174 moves into the sensing field of one of the switches 184, the switch 184 will be actuated to a "switch on" condition, sending a signal to the control module 188.

Figure 5:
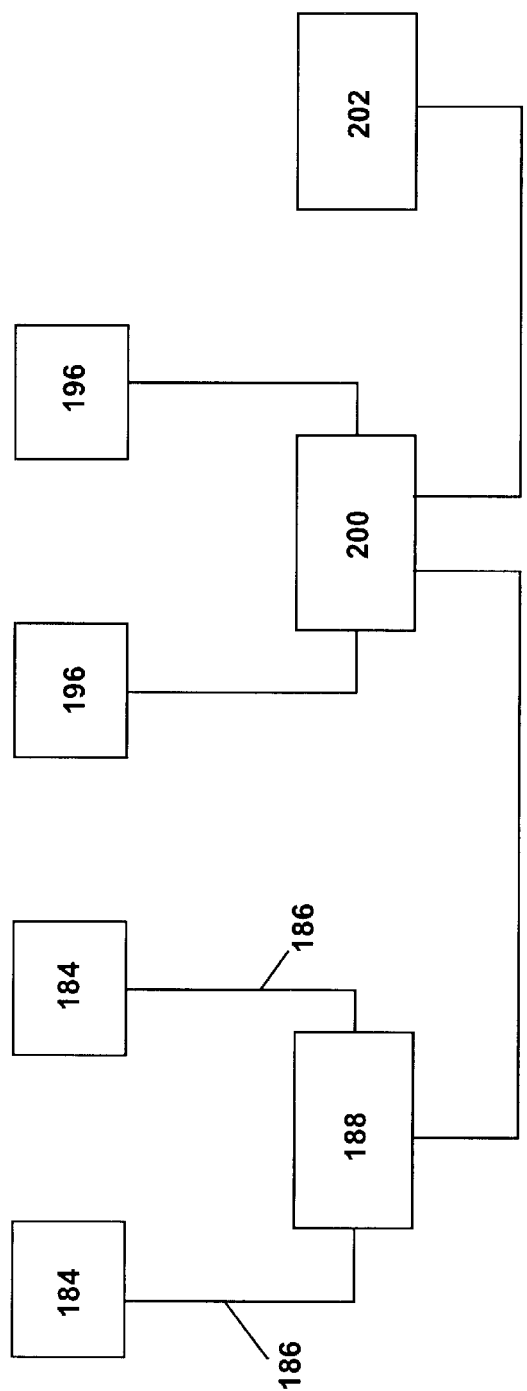
FIG. 5 is a schematic view of the electrical and fluid connections of the belt control assembly.

The belt 14, 16 is supported on at least one adjustable belt guide roller 30, 32. The roller 30, 32 is journaled into a conventional roller bearing 190 that is housed in a bearing housing 192. An adjustable roller bearing assembly comprises a conventional roller bearing 190, a bearing housing 192, a frame mounting plate 198, a bellows plate 194, and a bellows 196. The bellows plate 194 is rigidly mounted to the bearing housing 192. The bellows 196 is rigidly mounted between the bellows plate 194 and the frame mounting plate 198. The frame mounting plate 198 is rigidly mounted to the frame 12. The bearing housing 192 is not mounted to the frame 12 and is able to move relative thereto. The adjustable roller bearing assembly is adapted so that expansion of the bellows 196 will shift the bearing housing 192 laterally and will move the roller 30, 32 laterally. As shown in FIG. 5, the bellows 196 is fluidly connected through an air valve 200 and suitable fittings to a supply of pressurized air 202. The air supply 202 is also operably connected through the air valve 200 to the control module 188. Alternatively, the bearing housing 192 can be operatively connected to a motor (not shown), such as an electric motor or a hydraulic motor, through, for example, a rack and pinion gear, for lateral adjustment of the position of the bearing housing in response to the operation of the motor in response to a signal from the control module.

If the switch 184 is in the "switch on" condition, the signal from the switch 184 sent to the control module 188 will be processed to actuate the air valve 200 to direct air from the pressurized air supply 202 to the bellows 196. Depending upon which switch 184 is in the "switch on" condition, pressurized air will be supplied to one of the bellows 196. Expansion of the bellows 196 will cause the bearing housing 192 to shift laterally, moving the roller laterally, and adjusting the belt 14, 16 to the desired position.

While the invention has been specifically described in connection with certain specific embodiments thereof, it is to be understood that this is by way of illustration and not of limitation. Reasonable variation and modification are possible within the scope of the forgoing description and drawings without departing from the spirit of the invention.

What is claimed is:

1. A device for adjusting the lateral position of an endless belt, comprising:

a sensor for detecting the lateral position of an endless belt relative to a predetermined position;

a roller disposed adjacent to the endless belt;

a controller operatively connected to the sensor and to the roller, an air bellows operably connected to the controller to move the roller laterally in response to a signal from the controller, wherein the volume of air in the bellows is controlled by an air valve and the controller signals the air valve to open and close to adjust the air volume in the air bellows whereby the controller will automatically cause the roller to urge the endless belt toward the predetermined positioned when the sensor detects that the lateral position of the endless belt is away from the predetermined position.

2. The device of claim 1, wherein the sensor comprises an inductive proximity transducer.

3. The device of claim 1, wherein the sensor comprises a wheel disposed against an edge of the belt in rotational communication therewith.

4. The device of claim 1, wherein the sensor signals the lateral position of the endless belt to the controller.

5. The device of claim 1, wherein the controller is a computer.

6. A device for adjusting the lateral position of an endless belt disposed to move over a roller in a given direction, comprising:

a sensor for detecting the lateral position of the endless belt relative to a predetermined position;

an air bellows operably connected to at least one end of the roller in a position to adjust the position of the roller relative to the belt by expansion or contraction of the bellows; and a controller operatively connected to the sensor and to the air bellows wherein the controller will automatically cause the air bellows to expand or contract, thereby adjusting the position of the roller to urge the endless belt toward the predetermined positioned when the sensor detects that the lateral position of the endless belt is away from the predetermined position.

7. The device of claim 6, wherein the air bellows urges the roller to move laterally in response to a signal from the controller.

8. The device of claim 6 wherein the air bellows urges the one end of the roller to move in the given direction to cause the belt to move laterally relative to the roller.

9. The device of claim 6 wherein the air bellows is positioned in the given direction.

10. The device of claim 6 wherein the air bellows is a first air bellows and a second air bellows is positioned in the given direction opposite the one end of the roller from the first air bellows.

11. The device of claim 6 wherein an air valve is positioned between the controller and the air bellows, and the controller automatically causes the air bellows to expand or contract by signaling the air valve.

* * * * *